United States Patent [19]

Croso et al.

[11] 3,715,703

[45] Feb. 6, 1973

[54] SUPERCONDUCTING SWITCH

[75] Inventors: Hubert Croso, Ris-Orangis; Gerard Prost, Bagneux; Andre Quefellec, Villeneuve-Saint-Georges; Jean Sole, Clamart, all of France

[73] Assignee: Commissariat A L'Energie Atomique, Paris, France

[22] Filed: June 8, 1971

[21] Appl. No.: 151,172

[30] Foreign Application Priority Data

June 18, 1970 France .......................... 7022448

[52] U.S. Cl. ..........................338/32 S, 174/DIG. 6

[51] Int. Cl. ..........................H01c 7/16

[58] Field of Search.338/32 S; 335/216; 340/166 SC, 340/173.1; 307/306; 174/DIG. 6; 336/DIG. 1; 330/62

[56] References Cited

UNITED STATES PATENTS

| | | | |
|---|---|---|---|
| 3,541,475 | 11/1970 | Gange et al. | 340/173.1 X |
| 3,292,021 | 12/1966 | Hoag | 307/306 X |
| 3,576,551 | 4/1971 | Gange | 340/173.1 |
| 3,491,345 | 1/1970 | Gange | 340/173.1 |
| 2,935,694 | 5/1960 | Schmitt et al. | 307/306 X |
| 3,310,767 | 3/1967 | Buchhold | 338/32 S |
| 3,339,165 | 8/1967 | Garwin | 340/173.1 X |

*Primary Examiner*—C. L. Albritton
*Attorney*—Cameron, Kerkam & Sutton

[57] ABSTRACT

The superconducting switch comprises at least one superconducting hairpin element having two arms through which currents pass in opposite directions and the distance *d* between the two arms of a hairpin element is appreciably smaller than the distance D between two adjacent elements.

5 Claims, 10 Drawing Figures

SUPERCONDUCTING SWITCH

This invention relates to a superconducting element which is capable of being switched from the superconducting state to the normal state in which the superconducting properties disappear even when the electric power to be switched is of very large magnitude.

The principle of superconducting transition switches is well known per se and consists in employing a portion of a superconducting element which carries an electric current and in associating with this latter a device whose function is to cause an abrupt increase in either the temperature or the magnetic field in said element. However, in conventional switches, the magnitude of the switchable power is always limited; especially in the case of a homogeneous material, the upper limit of switchable power is expressed by the relation :

$$RmI^2 = \rho\delta^2 v, \qquad (1)$$

wherein $Rm$ is the maximum resistance of the element which constitutes the switch in the normal state, I is the current carried by the switch in the superconducting state, $\rho$ is the resistivity of the material of the element in the normal state, $\delta$ is the current density in the switch in the superconducting state and finally $v$ is the volume of the superconducting material which constitutes the element considered. It should be noted that if the material employed for the superconducting element is not homogeneous but consists of a composite material, it is only necessary to replace the different values on the right-hand side of the above relation by their corresponding apparent value in the composite material considered.

In order that the specific electric power in the superconducting element (namely the power per unit volume of the constituent material) should be as high as possible, it is advisable to ensure that the term $\rho\delta^2$ on the right-hand side of relation (1) should also have the highest possible value. In point of fact, in the case of a given material, the resistivity $\rho$ in the normal state has a well-determined value ; on the other hand, the density $\delta$ of current which can be passed through the superconducting element which constitutes the switch when this latter is in the superconducting state is always limited by the need to prevent any potential danger of transition of said element or in other words any risk of instability. In particular, the upper limit of the current density corresponds to the value of the density of stable current which can be passed through a conductive element of limited length formed of the material considered, said element being designated hereinafter by the term "short sample."

A number of different solutions have already been contemplated for increasing the value of resistivity of the switch in the normal state. One of these consists in particular in reducing or even in dispensing with the layer or cladding of stabilizing conductive material which is usually associated with the superconducting material itself and which is intended in the event of accidental local transition of said material to bridge this latter and to shunt the current in order that the local transition should not extend to the entire superconducting element. However, if said external cladding is reduced or even dispensed with, the stability of the superconducting element is therefore automatically limited, in particular as soon as the current density rises, the result thereby achieved being directly contrary to the object which is sought.

Finally, it is worthy of note that the foregoing considerations are always applicable to a superconducting element of limited length, namely a short sample ; however, in the majority of the industrial applications which are contemplated, it is necessary to employ lengths of superconducting material such that the concept of short sample can no longer be retained. Under these conditions, this results in a second cause of degradation which reduces to an even greater extent the density of stable current which can pass through the superconducting element considered. This double phenomenon of degradation which is liable to reduce the stable current density to a very substantial extent presents a particularly unfavorable case in the construction of superconducting transition switches since the specific power of these latter varies as the square of said current density as indicated above in relation (1). On the other hand, the possibility of attaining stable current densities in the vicinity of those which correspond to a short sample would make it possible by means of a material which also has a high normal resistivity to obtain switches which are capable of withstanding very high values of specific power.

The precise object of the present invention is to provide a superconducting switch having a length of any desired value which permits the passage of a very high current density and consequently makes it possible to transfer electric power of appreciable magnitude which is in fact very distinctly larger than the values permitted by conventional switches.

A study of the behavior of conductive elements of superconducting material and more especially of inductively-coupled superconducting windings shows that the apparent instabilities of said windings which consist on the one hand of substantial lengths and are not provided on the other hand with any stabilizing external cladding are related to the value of the magnetic coupling which exists between the different portions of said windings and also between the different turns of these latter.

The present invention accordingly consists in reducing said magnetic couplings to the greatest possible extent both between the different conductors of a number of windings and between the individual turns of these latter.

To this end, a superconducting switch which is designed according to the invention and comprises at least one superconducting conductive element having a general configuration known as a hairpin having two arms through which currents pass in opposite directions is distinguished by the fact that the distance d between the two arms of a conductive hairpin element is appreciably smaller than the distance D between two adjacent elements.

Consideration has already been given to the construction of superconducting circuits in which the conductive element is folded-back in order to obtain magnetic compensation. However, in the design solutions which are already known, such compensation is intended only for elements of substantial length which are placed at equal distances from each other. The only result thereby achieved is a total compensation of the fields which are produced. In consequence, if a slight increase in current takes place in one element, this increase influences the other elements and initiates a hunting phenomenon, thus producing an oscillation which is liable to result within a very short time in transitions having a local or even a general character.

The hairpin configuration which is primarily contemplated in accordance with the invention makes it possible in particular to provide local compensation for magnetic radiation of any conductive-element section of the winding or windings considered so that these latter in fact behave generally as short samples which are magnetically independent of adjacent samples and consequently are capable of withstanding and then switching electric powers of very substantial magnitude. Accordingly, if the distance d is itself of small value, the magnetic radiation between the two arms of the hairpin through which currents flow in opposite directions is thus attenuated to an appreciable extent. Moreover, if D is of substantial value, each hairpin is separated from the adjacent hairpin by a distance such that the field which is radiated by the former has no great influence on the latter and conversely.

The above-mentioned configuration makes it possible to endow each winding with a very low self-inductance coefficient since the stored energy is itself of very small magnitude and this has a very favorable effect on the switching speed and efficiency. However, it should be noted that the lengths of the two hairpin arms which constitute the superconducting elements must be disposed in such a manner as to prevent the magnetic effect of the extremity of one arm from being compensated by the extremity of the other arm which is too distant electrically as this would correspond on the contrary to a magnetic coupling between these two arms.

The arrangements of the invention thus make it possible by splitting-up into short samples to obtain an element having as substantial a value of overall length as may be necessary and constituted by a superconducting material which need not be provided with a stabilizing cladding, the electrical properties of said element being similar to those of a short, single and stable sample and each short sample being compensated by the adjacent sample independently of the other samples. These arrangements make it possible in particular to provide for operation as a transition switch comprising a plurality of conductive elements either in series or in parallel, the characteristics of each element being retained in exactly the same manner as if said elements had been employed alone.

A clearer explanation of the invention will be given by means of the complementary description which now follows in connection with a number of practical examples which are mentioned by way of indication without any implied limitation, reference being made to the accompanying drawings, wherein :

FIG. 1 illustrates a superconducting conductive element of the hairpin type in its simplest form of construction ;

FIGS. 2*a* and 2*b* illustrate the series arrangement of a number of superconducting elements in accordance with FIG. 1 ;

Figure 5A:
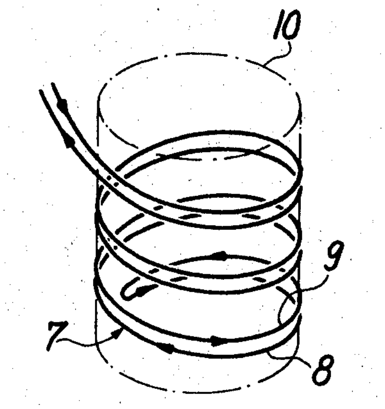
Figure 5B:
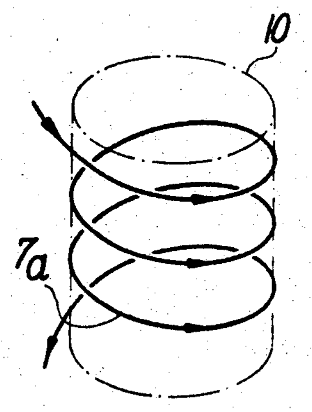
Figure 6:
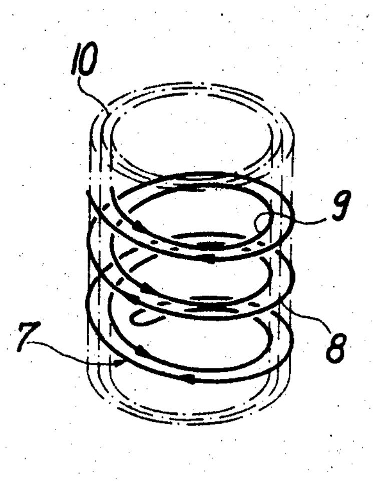
Figure 7:
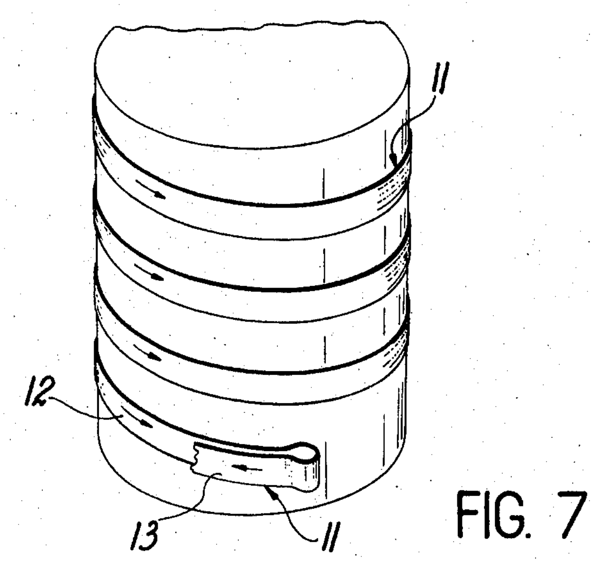
Figure 8:
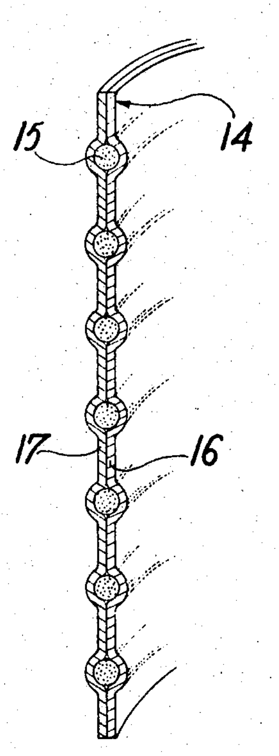

FIGS. 5*a* and 5*b* illustrate yet a number of other alternative embodiments comprising a single superconducting element, the length of which permits continuous winding of said element on the surface of a cylindrical support ;

FIG. 6 is an alternative form of the arrangement according to FIG. 5*a* ;

FIG. 7 illustrates another embodiment in which each conductive element in the form of a strip is in turn made up of a plurality of wires or cables which are mounted in parallel ;

FIG. 8 is a detail view on a larger scale showing a portion of the conductive element which is employed in the embodiment of FIG. 7.

Figure 1:
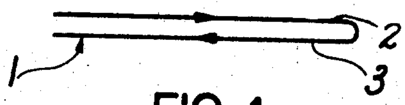

In FIG. 1, the reference numeral 1 designates a conductive element of superconducting material, the arms 2 and 3 of which are placed parallel to each other in known manner in order to form a hairpin, the currents which pass through said arms being thus in opposite directions. By virtue of this simple arrangement, the magnetic radiation of one of the arms is accordingly neutralized by the magnetic radiation of the other arm which is placed in its immediate vicinity.

Figure 2A:
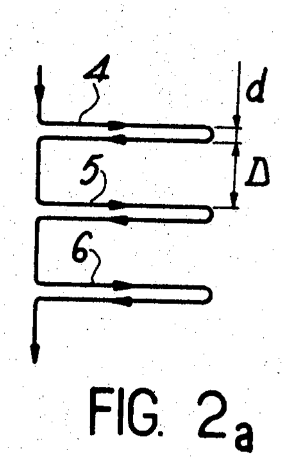

FIG. 2a represents in accordance with the invention the series connection of conductive elements which are designated respectively by the reference numerals 4, 5 and 6, and which are similar to the element of FIG. 1 ; these different elements are connected in series so that, if d designates the distance between any two arms of one of the elements aforesaid, said distance should be relatively very small compared with the distance D between any two elements.

Figure 2B:
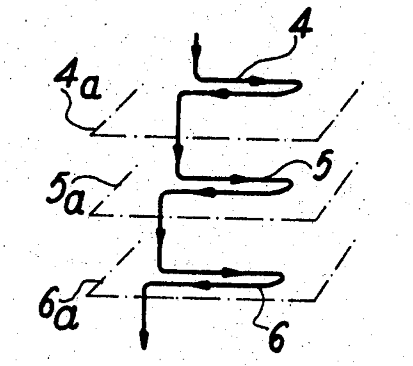

In the preceding alternative embodiment, the different superconducting elements 4, 5 and 6 are all located in the same plane which may be considered by way of example as the plane of the figure. On the contrary, in the alternative form which is illustrated in FIG. 2*b*, the elements 4, 5 and 6 are located in parallel planes as designated respectively by the references 4*a*, 5*a* and 6*a*, the relation between the distances d and D being maintained. In this particular arrangement, each outgoing arm of a conductive hairpin element can be placed behind the plane of the figure and each return arm can be placed in front of this plane, thereby increasing the magnetic decoupling between two consecutive hairpins to an even greater extent.

Figure 3:
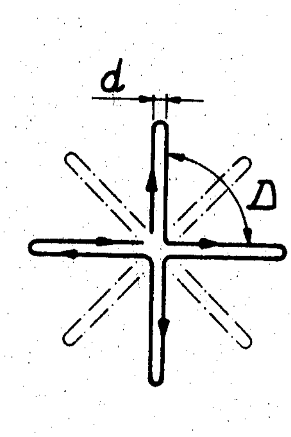
FIG. 3 illustrates an alternative form of the same arrangement.

FIG. 3 shows a different arrangement in which the successive elements are located in the same plane but angularly displaced with respect to each other. There are also shown in this figure the distances d and D which, as in the previous arrangements, satisfy the relation in which d is substantially smaller than D.

Figure 4:
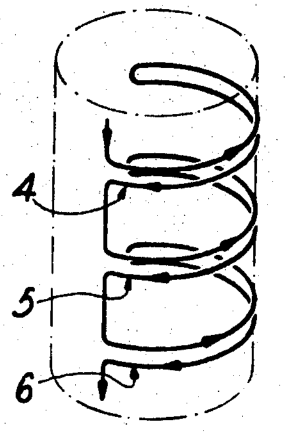
FIG. 4 illustrates another alternative embodiment in which the superconducting elements which are mounted in series are wound on the surface of a supporting cylinder.

There is again shown in FIG. 4 an arrangement which is derived from the arrangement of FIG. 2*a* but in which the conductive elements 4, 5 and 6 are wound on a cylindrical support.

FIGS. 5*a* and 5*b* relate to a different arrangement, particularly insofar as the single conductive element which is shown is of appreciable length. In FIG. 5*a*, the conductive element forms with its arms 8 and 9 a continuously-wound layer on a cylindrical support 10 which can be formed of any insulating, conducting or superconducting material. It should be noted in this alternative embodiment that the length of the element must not be too great in order to prevent the occurrence at the extremities of the hairpin arms of magnetic compensation between two superconducting sections which are too distant electrically as this would correspond to a coupling of these latter.

In the arrangement of FIG. 5*b*, the compensation resulting from magnetic radiation is effected within the single conductive element 7*a* which is wound on the cylinder 10 by virtue of the current induced in said cylinder which must necessarily be formed of superconducting material in this case. However, said cylinder can be solid or constituted by a single superconducting later. The arrangement last mentioned can make it possible in particular to carry out in combination with the switch formed by the winding 7*a* itself a recovery of the energy which is released into a separate circuit (not shown), said circuit being coupled with the cylinder and connected to the terminals of a utilization apparatus.

In the alternative embodiment according to FIG. 6, the two arms 8 and 9 of the element 7 are no longer placed against the surface of the supporting cylinder 10 but extend along a surface which is perpendicular to this latter. If necessary, it would also be possible to employ instead of a double conductor disposed in the form of a hairpin a conductor formed of a thick strip in which the superconducting material would be placed in opposite relation in the arms through which the current flows in outward and return paths.

FIGS. 7 and 8 illustrate a more detailed example of construction of a superconducting switch according to the invention. In FIG. 7, the conductive winding is constituted by a plurality of double layers 11 (four in number in the example which is illustrated), each layer being made up of several turns of strip which are arranged so as to form loops and currents flow in opposite directions in the two arms 12 and 13 of said loops. Packing pieces (not shown) are fitted in the winding in order to prevent flattening of said loops. One layer 11 of the winding is shown in detail and on a larger scale in FIG. 8. The strip 14 which is employed is made up of a number of parallel superconducting wires 15 which are seven in number in the example which is illustrated. Said wires are maintained with respect to each other at a distance D of 2 mm by means of two adhesive sheets 16 and 17 or by means of an electric insulating element which is either molded or bonded around the superconducting wires. The thickness of said sheets or elements is smaller than 0.1 mm and the opposite adhesive faces of these latter are intended to maintain the wires in position. The wires are advantageously formed of niobium-titanium and have a diameter of approximately 300 microns. The total length of the strip is 400 m ; the distance d between the outward and return arm of the same wire is equal to 0.2 mm. Under these conditions, the minimum distance between two wires of two different hairpins is 2 mm whereas the distance between two wires in the same hairpin but located in two consecutive layers of the winding is also of the order of 2 mm.

In a winding of this type, it is possible in particular to obtain within the wires a current density of $1.7 \times 10^5$ A/cm$^2$ (corresponding to a total current of 850 A) without giving rise to instability phenomena ; in the normal state, the resistance of the winding is 660 ohms. By comparison with a switch which is constructed in a conventional manner and formed of single conducting wires which are not divided in the form of hairpins, the current density is in that case only $10^4$ A/cm$^2$. Inasmuch as the switchable powers are in the ratio of the squares of current densities in the superconducting state in respect of equal values of resistivity in the normal state, the result thereby achieved is that said ratio is accordingly improved with a factor of the order of approximately 300.

It is readily understood that the invention is not limited in any sense to the exemplified embodiments which have been more especially described with reference to the drawings but extends on the contrary to all alternative forms.

We claim:

1. A superconducting switch comprising at least two consecutive superconducting conductive elements each having the general configuration of a hairpin having two arms through which currents pass in opposite directions, the distance between the two arms of a conductive hairpin element being appreciably smaller than the distance between two adjacent elements and said elements being electrically decoupled.

2. A switch in accordance with claim 1, wherein said switch comprises a plurality of conductive elements selectively connected in series and in parallel.

3. A switch in accordance with claim 1, wherein the conductive elements are located in the same plane.

4. A switch in accordance with claim 1, wherein the conductive elements are located in parallel planes.

5. A switch in accordance with claim 1, wherein the conductive elements extend in planes perpendicular to the surface of the support.

* * * * *